July 15, 1924.

P. RASMUSSEN

APPARATUS FOR COOLING AND CHILLING HOT CHOCOLATE AND OTHER CONFECTION COVERED CAKES

Filed Sept. 23, 1922

P. RASMUSSEN

APPARATUS FOR COOLING AND CHILLING HOT CHOCOLATE AND OTHER CONFECTION COVERED CAKES

Filed Sept. 23, 1922

Inventor
By Peter Rasmussen.
H. S. Bailey, Attorney

July 15, 1924.

P. RASMUSSEN 1,501,724

APPARATUS FOR COOLING AND CHILLING HOT CHOCOLATE AND OTHER CONFECTION COVERED CAKES

Filed Sept. 23, 1922    5 Sheets-Sheet 3

July 15, 1924.

P. RASMUSSEN

APPARATUS FOR COOLING AND CHILLING HOT CHOCOLATE AND OTHER
CONFECTION COVERED CAKES

Filed Sept. 23, 1922    5 Sheets-Sheet 4

Inventor
Peter Rasmussen
By H. S. Bailey
Attorney.

July 15, 1924.                                                   1,501,724
P. RASMUSSEN
APPARATUS FOR COOLING AND CHILLING HOT CHOCOLATE AND OTHER
CONFECTION COVERED CAKES
Filed Sept. 23, 1922         5 Sheets-Sheet 5

Patented July 15, 1924.

1,501,724

UNITED STATES PATENT OFFICE.

PETER RASMUSSEN, OF DENVER, COLORADO, ASSIGNOR OF ONE-HALF TO STEPHEN KNIGHT, OF DENVER, COLORADO.

APPARATUS FOR COOLING AND CHILLING HOT CHOCOLATE AND OTHER CONFECTION-COVERED CAKES.

Application filed September 23, 1922. Serial No. 590,205.

*To all whom it may concern:*

Be it known that I, PETER RASMUSSEN, a citizen of the United States of America, residing at the city and county of Denver and State of Colorado, have invented a new and useful Apparatus for Cooling and Chilling Hot Chocolate and Other Confection-Covered Cakes, of which the following is a specification.

My invention relates to a new hot chocolate cooling, chilling and icing apparatus for hot chocolate and other confection covered cakes such as are made by cake and cracker and confection making manufacturers.

And the objects of my invention are:

First: to provide a hot chocolate cooling, chilling and icing apparatus that is arranged to deliver hot chocolate cakes in a cooled or chilled or iced condition to box packing operators standing at the opposite sides of the apparatus.

Second: to provide a humidified air cooling, chilling and icing apparatus specially adapted for hot chocolate covered cakes and confections, that quickly cools, chills and ices hot chocolate materials on cakes and confections and that automatically loosens the cakes so that the packing operators can remove the cold, hardened product from the apparatus and pack it in packing boxes for shipment.

Third: to provide a simple, easily and cheaply constructed hot chocolate cake and confection products cooling and chilling and icing apparatus, all the parts of which are readily accessible and that requires little attention and is thoroughly practical in all of its operative features.

I attain these objects by the mechanism illustrated in the accompanying drawings in which.

Similar letters of reference refer to similar parts throughout the several views.

Figure 1:
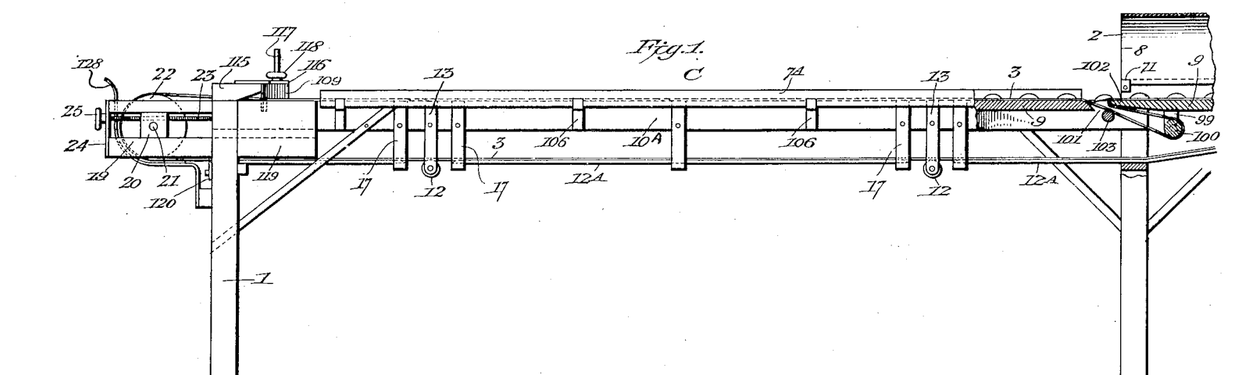
Figure 1 is a side elevation of the distributing portion of the apparatus or that part beyond the discharge end of the tunnel.
Figure 2:
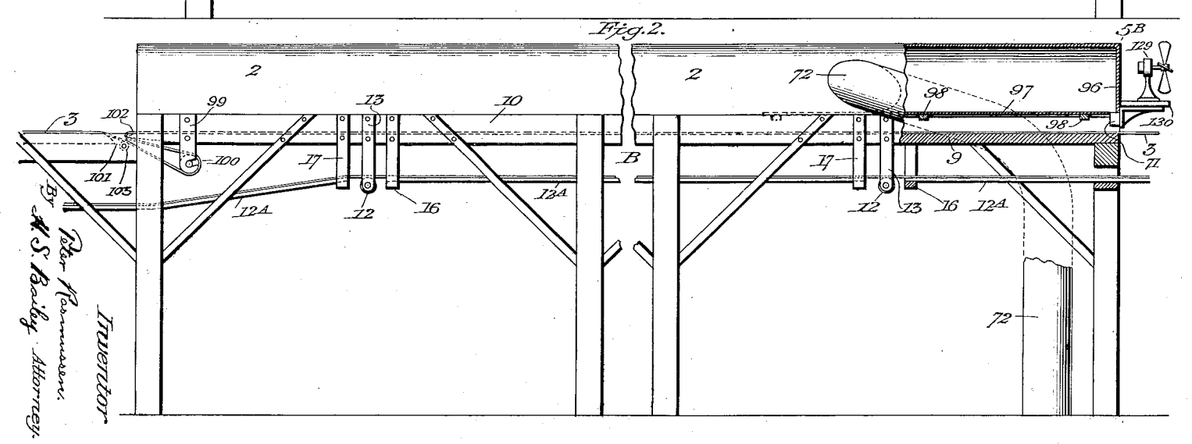
Figure 2 is a side view partly in section of the tunnel portion of the apparatus, a considerable part of the intermediate portion of said tunnel being omitted for lack of space.
Figure 3:
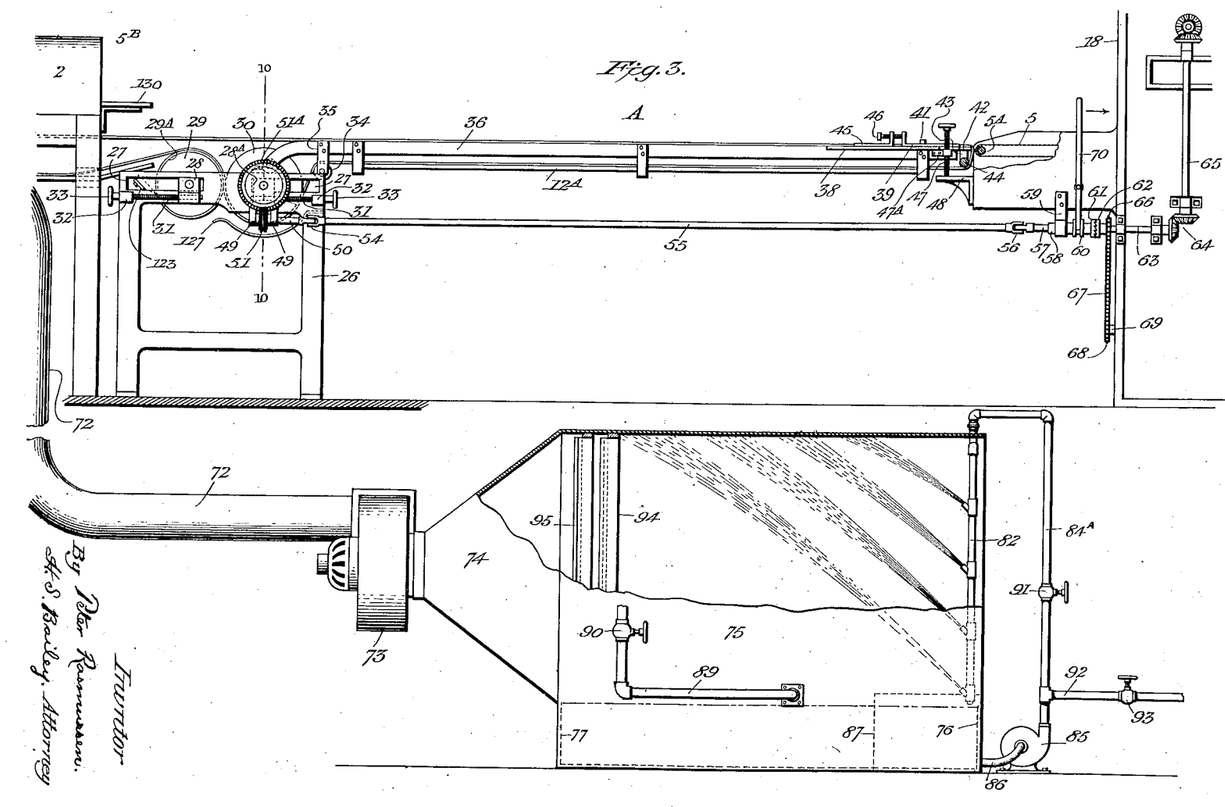
Figure 3 is a side view of the coated cake-receiving portion of the apparatus, or that part of it lying between the inlet end of the tunnel and the coating machine; and also showing a side view partly broken away, of the air cooling cabinet and the pipe connecting the same with the tunnel.
Figure 4:
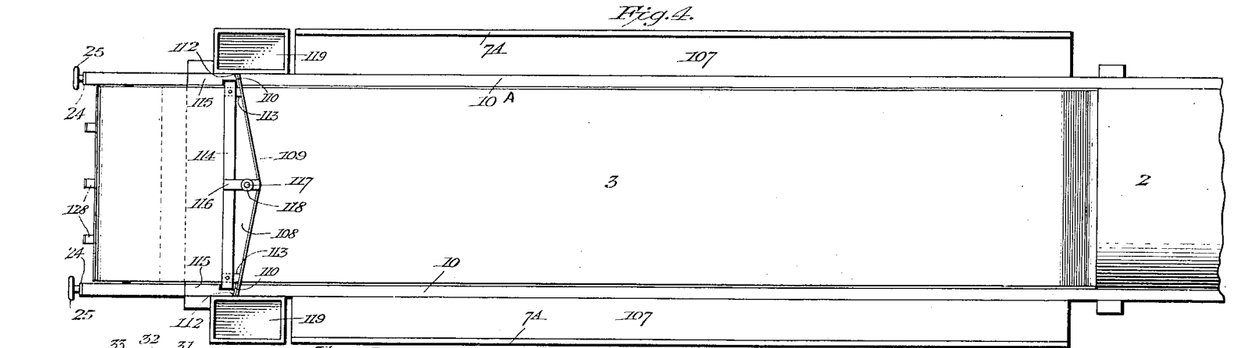
Figure 4 is a plan view of Figure 1.
Figure 5:
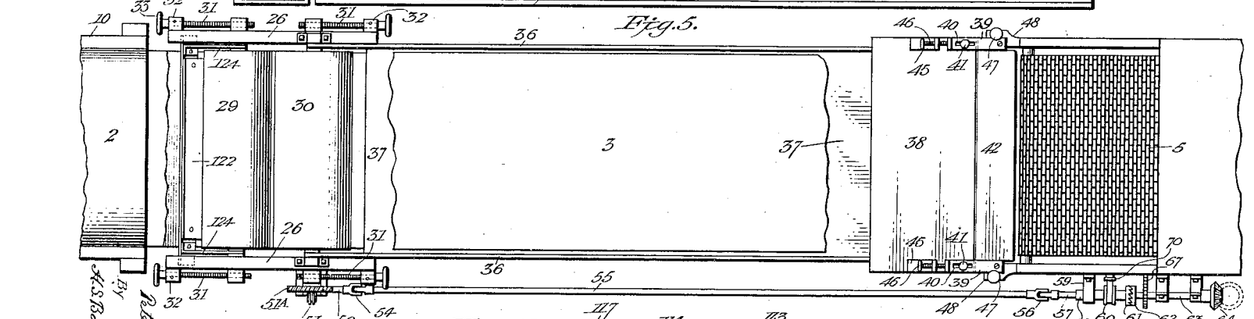
Figure 5 is a plan view of Figure 3 omitting the air cooling cabinet.

Referring to the drawings, a side elevation of an apparatus embodying the hot chocolate chilling apparatus is illustrated in Figures 1, 2 and 3, and a plan view of my hot chocolate chilling apparatus is shown in Figures 4 and 5, while cross sections and detail views are shown in the other views of the drawings.

In these several views, the numeral 1 designates the supporting frame work of my chocolate conveying and tunnel mechanism, which is preferably made of small dimension lumber such as 2 x 4 boards and other sizes of lumber, which are so cooperatively arranged as to form a supporting bench for the tunnel member 2 and the endless conveyor 3.

The endless conveyor 3 receives the hot chocolate coated cakes on its forward end from an endless wire traveling belt 5 that forms a part of a chocolate coating machine. I do not illustrate the chocolate coating part of this machine as it does not form a part of my present invention.

This endless conveyor belt may be of any desired length but I preferably make it about sixty feet long by two feet wide but of course it may be narrower or wider if desired and it is preferably made of canvas, but some other suitable belting can be used, if desired.

At several feet from the hot chocolate-covered-cake receiving end of the conveyor, preferably about ten feet, the forward end 5ᴮ of the chilling tunnel is placed. And this tunnel 2 is preferably of substantially a semi-circular shape and it is preferably about forty feet long by about twelve inches high and two feet four inches wide, and it is preferably made of thin sheet iron either plain surfaced or galvanized as desired.

The outside surface of this tunnel is covered with sheet asbestos, or any other heat resisting material.

The hot chocolate covered cakes are fed onto the receiving end of the conveyor 3, from the chocolate coating machine in transversely arranged rows, spaced at about three inches apart and the chocolate covered cakes are also placed about three inches apart for average sized cakes, but may be placed any suitable distance apart for large or long cakes that will allow the packing operators to readily pick them off the rear end C of the conveyor, beyond the discharge end 8 of the tunnel 2.

My hot chocolate chilling tunnel 2 is made wide enough to allow the long endless conveyor belt 3 which may be of any particable width to carry a large number of cakes and to allow them to be easily removed from it by box packing operators standing on opposite sides of its rear end beyond the discharge end of the tunnel. The tunnel is provided with a flat, smooth, floor 9, that is preferably made of wooden boards and the sides of the tunnel are secured to side rails 10 that form a part of the supporting frame 1, and which side rails extend through the tunnel and quarter-round strips 11 are secured along the opposite sides of the floor against the said rails.

The underside of this long, endless, conveyor belt 3 is supported by and runs on rollers 12, which are journaled in hangers 13 which are secured to the side rails 10 of the tunnel section B, and the side rails 10ᴬ of the distributing section C. In addition to the rollers 12, I employ slats 12ᴬ which extend the length of the conveyor and which not only support the conveyor but which are especially designed to support the loose ends of short sheets of paper 14 which I secure either by sewing or pasting them with a suitable paste or glue to the upper cake supporting surface of the endless conveyor 3.

The object of using these short pieces of paper is as follows:

The cakes are covered all over, that is, top, sides and bottom, with hot chocolate, which is of a soft, pasty consistency, and the hot chocolate cakes that are placed directly on the canvas conveyor belt, have a somewhat rough bottom surface owing to the coarse mesh of the threads of the canvas, which the soft, hot chocolate sinks into and the chocolate receives the impression of the rough surface of the canvas. Nevertheless very large quantities of chocolate covered cakes have this canvas impression on them and consequently have rough bottoms.

Figures 6, 7, 8, 15, 18, 19:
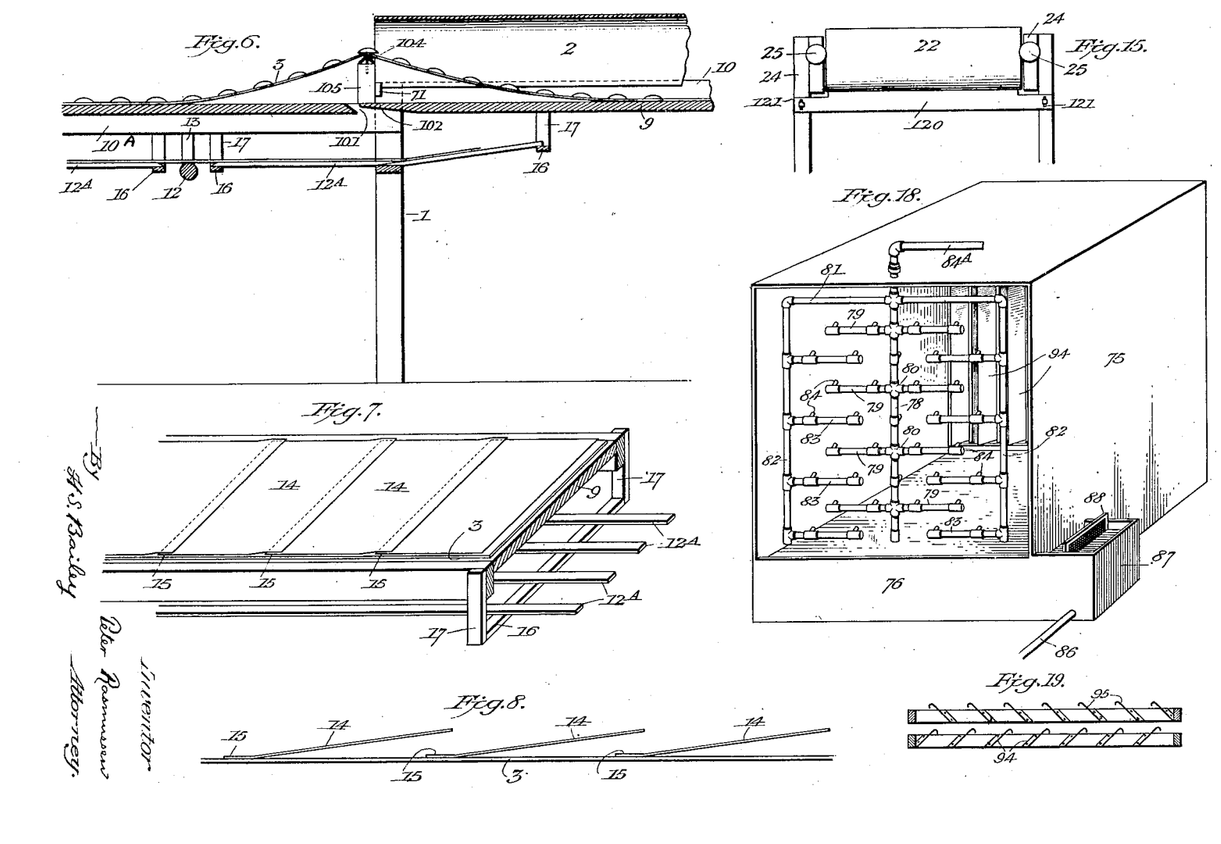
Figure 6 is a sectional view of a part of the tunnel and distributing sections of the apparatus, and showing a different manner of separating the cakes from canvas, than that shown in Figures 1 and 2.
Figure 7 is a perspective view of a part of the apparatus and showing overlapping paper strips secured to the endless cake-carrying belt, and means for supporting said strips on the under lap of the belt.
Figure 8 is a diagrammatic view showing more clearly the manner of securing the paper strips to the belt.
Figure 15 is a front view of the scraper for removing coating from the underlap of the conveyor belt.
Figure 18 is a perspective view of the air cooling cabinet.
Figure 19 is a horizontal, sectional view through the two rows of baffle plates.
Figure 9:
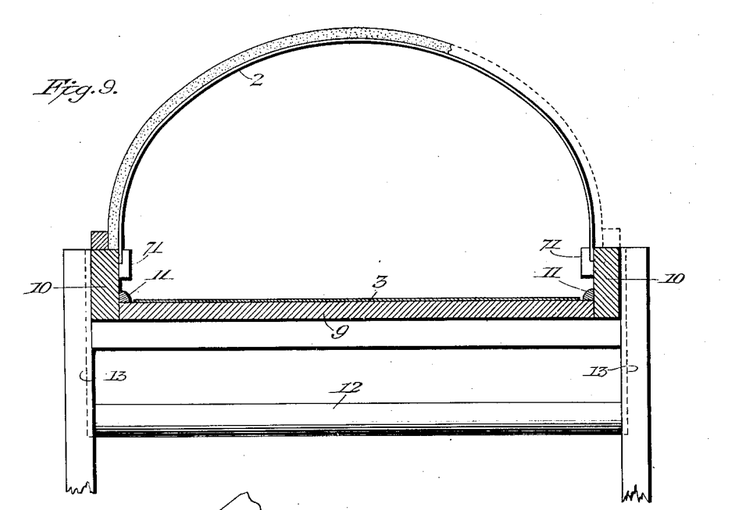
Figure 9 is an enlarged transverse sectional view of the tunnel.
Figures 10, 11, 12, 13, 14:
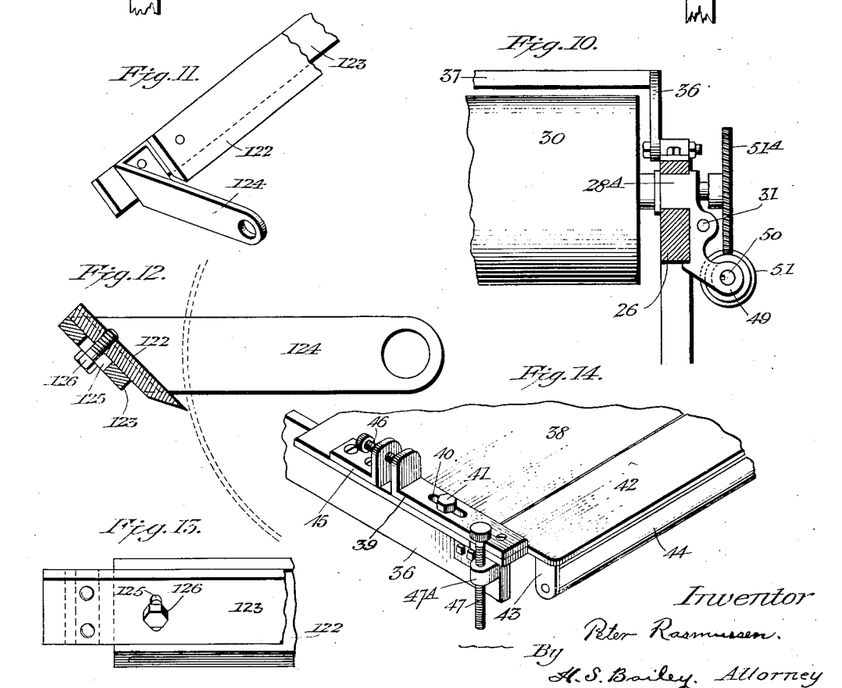
Figure 10 is a detail sectional view, enlarged—on the line 10—10 of Figure 3.
Figure 11 is a perspective view of a portion of the pinch roll scraper and its supporting means.
Figure 12 is a transverse, vertical, sectional view through the pinch roll scraper.
Figure 13 is a rear view of one end portion of the same.
Figure 14 is a perspective view of a portion of the front end of the cake receiving portion of the apparatus.

There is, however, a demand in the consuming trade for chocolate covered cakes that have a perfectly smooth and substantially polished bottom surface, and in order to give this finish to the bottom of the cakes, I use short strips of paper that are about twenty-four inches wide by about three feet long, and their forward edges 15, are sewed or pasted to the canvas belt and the balance of their lengths lie loosely and smoothly on top of the canvas belt and they overlap by several inches the secured edges of the sheets of paper that are laid in progressive order back of each other as shown in Figure 7.

I have to make these sheets of paper 14, lie loose and free on the surface of the canvas belt except along their edges that are secured to the belt in order that they may move around the rollers that support the belt without crimping up which would tear them, but being loose, they can creep out perfectly straight as they pass over these rollers.

When these sheets of paper arrive at the forward end portion of the belt and pass around a roller to be presently described, their loose part would hang down almost vertically from their edge that is secured to the belt which would form a crease in them at their secured edge, consequently, to prevent this and hold them out straight, I employ the flat, smooth slats 12ᴬ which are supported upon crosspieces of wood 16, that are secured to hangers 17, that depend from the side rails 10 of the cooling apparatus.

These sheets of paper are of a suitable character for the purpose intended and have a surface which is perfectly smooth, substantially glossy and somewhat greasy, consequently the bottoms of the cakes have a very finished and polished appearance after they are chilled and the operators pick them off the discharge end of the conveyor.

The apparatus comprises three parts or sections, namely: the cake receiving section A which extends from the chocolate coating machine 18 to the entrance end 5$^B$ of the tunnel; the tunnel section B, which is the longest section of the apparatus, and the distributing section C which is that part of the apparatus beyond the outlet end of the tunnel.

Upon the forward end of the discharge section C are secured suitable guideways 19 in which are mounted bearing blocks 20 in which are journaled the ends of a shaft 21 which supports a roller 22. Hand screws 23 extend through the blocks 20 and through metal strips 24 on the ends of the guideways and are provided with knobs 25 having hubs which bear against the strips 24.

By turning the hand screws 23, the bearing blocks with the roller 22 may be moved back or forth in the guideways 19, and in this way the required tension can be given to the endless belt 3 which passes around the roller 22. The belt 3 is further supported and operated in the following manner: A frame or table 26 is secured to the floor at the inlet end of the tunnel and the upper horizontal side members of this frame are provided with pairs of guideways 27 in which are mounted bearing blocks 28 and 28$^A$ in which are journaled the shafts of a pair of rollers 29 and 30. The bearing blocks 28 and 28$^A$ are provided with extensions having threaded holes through which hand screws 31 pass; the said hand screws also pass loosely through apertured lugs 32 on the frame 26 and are provided with knobs 33 having hubs which bear against the lugs 32. By turning the screws 31 the bearing blocks 28 and 28$^A$ may be adjusted in the guideways 27 to move both the rollers 29 and 30 or to adjust one roller with respect to the other. The roller 29 I term the pinch roller and it is provided with a canvas facing 29$^A$. The under lap of the belt 3 passes over the pinch roller 29 and down between the roller 29 and the roller 30 which constitutes the drive roller. By adjusting the roller 29 so as to pinch the belt between it and the drive roller 30, the latter roller acts to operate the belt, and power is applied to the roller 30 in a manner to be presently described. After passing under the roller 30 the belt passes up over a roller 34 mounted in hangers 35 which are secured to side-bars 36 which are hinged at one end to the frame 26 and which support a table 37 which extends to within a slight distance of the roller 5$^A$ around which the wire screen endless belt 5 of the chocolate coating machine passes. A sheet metal plate 38 extends across this end of the table 37 and slightly beyond the side bars 36 and to the parts of this plate which extend over and beyond the side bars 36 are adjustably secured L-shaped bars 39 having slots 40 through which bolts 41 are passed, which enter threaded holes in the plate 38, thus adjustably securing the bars 39 to the plate 37. These bars extend beyond the forward edge of the plate 38, and to these extended portions of the bars are secured a narrow metal plate 42, the plates 38 and 42 being flush with the top of the table 37. To the forward portion of the plate 42 are secured hangers 43 in which is mounted a roller 44; and after passing from the roller 30 over the roller 34, the endless belt 3 extends to and under the roller 44 and thence up over the edge of the plate 42 and from this point, over the tables 37 and 9 to and around the roller 22, at the opposite end of the apparatus. Back of and near the L-shaped bars 39 are L-shaped bars 45 which are rigidly secured to the plate 38, the vertical members of the bars being next to each other. Thumb screws 46, pass through the vertical members of the bars 45, and bear against the vertical members of the bars 39, and when these screws are turned against the said bars 39, they are moved forward and carry with them the plate 42, the edge of which may thus be made to lie as close to the roller 5$^A$ of the chocolate coating machine as may be desired. As the belt 3 passes over this edge of the plate, it makes such an abrupt turn, that only a slight gap or space separates this turning point of the belt 3 from the adjacent end of the wire belt 5, so that the freshly coated cakes on the belt 5 may be continuously transferred to the belt 3 without danger of being tipped over or broken, owing to the slight gap they bridge in passing from one belt to the other.

Hand screws 47 pass through threaded holes in blocks 47$^A$ which are bolted to the outer ends of the bars 36 and their ends rest upon brackets 48 which are bolted to the adjacent part of the chocolate coating machine, as clearly as shown in Figure 3, and by manipulating the screws, the free end of the table 37 may be raised or lowered so that the plate 42 may be level with the wire belt 5. One of the bearing blocks 28$^A$ which support the shaft of the drive roller 30, is provided with a depending member which is divided or bifurcated to form two bearing members 49, which support a short shaft 50 upon which is slidably but non-rotatably mounted a worm pinion 51, which lies between the two bearing members 49. The pinion 51 meshes with a worm gear 51ᴬ, which is rigidly secured upon a shaft of the drive roller 30. This pinion 51 is provided with a feather key 52—see Figure 17—which enters a groove 53 in the shaft 50. This arrangement permits the bearing block 28ᴬ to be moved back or forth in its guideway, irrespective of the shaft 50.

The shaft 50 is connected by a universal joint 54 with a main driving shaft 55, which at its other end is connected by a universal joint 56 with a short shaft 57, which is slidably but non-rotatably mounted in a sleeve 58, which is supported in a bearing 59 on the chocolate coating machine. The sleeve 58 is formed with an annularly-grooved collar 60, and its outer end is formed with a clutch member 61, which is adapted to engage a corresponding clutch member 62 on a shaft 63 mounted in suitable bearings on the chocolate coating machine. The shaft 63 is connected by bevel gearing 64, with a power driven shaft 65 on the chocolate coating machine.

The manner in which the shaft 65 is driven is immaterial as the said shaft forms no part of the present invention. The shaft 63, has a sprocket wheel 66 which is connected by a chain 67 with a sprocket wheel 68 on a shaft 69 of the chocolate stirring mechanism which is neither illustrated nor described as it forms no part of the present invention. A shifting lever 70 is pivotally mounted on the side of the chocolate coating machine, and is formed with the usual bifurcated end which engages the grooved collar 60. When the lever is shifted in the direction of the arrow, the clutch member 61 is disconnected from the clutch member 62, thus stopping the shaft 55, and its worm pinion 51, which drives the worm gear 51ᴬ, which rotates the drive roller 30, by which the endless belt 3 is operated. By this arrangement, the belt 3 can be stopped at any time, without stopping the shaft 63, which operates the stirring mechanism of the chocolate coating machine.

As the cakes pass through the coating machine they are completely coated with chocolate in a warm, liquid condition, and are transferred to the endless belt 3, while the coating is still in this condition. As it would take a considerable length of time, under ordinary conditions, for the coating to cool and harden sufficiently to permit of the removal of the cakes from the conveyor, artificial means must be employed for cooling and hardening the coating, within a short period after the cakes are transferred to the belt 3, in order that they may be removed and packed without loss of time. To accomplish this, the cakes are continuously conveyed through a tunnel of suitable length, which is artificially cooled, and as they emerge from the said tunnel, they are in condition to be removed and packed by attendants.

This tunnel is constructed and cooled in the following manner:

The tunnel comprises the greater part of the length of the apparatus, and is made up of arched sections of sheet metal, the edges of which rest in cleats 71 which are secured to the inner faces of the side rails 10. One end of a pipe 72 of relatively large diameter, enters the side of the tunnel adjacent the inlet end of the same, and the other end of this pipe connects with a pressure fan 73 which is secured upon a conical projection 74 of an air cooling cabinet 75, which may be located in any convenient part of the plant in which my improved apparatus is installed. The cabinet 75, is constructed preferably of galvanized sheet iron, is rectangular in cross section, and in the present instance is about five feet square by five or six feet in length. These dimensions, however, may vary to meet varying conditions. The front end of the cabinet is open from the top to within about twelve inches of its bottom and from this point it is closed by an end plate 76. A similar end plate 77, extends across the back end of the cabinet and these two end plates, with the sides of the cabinet, form a water tank. The rear end of the cabinet is also open above the end plate 77, and to this end is secured the conical extension 74 to which the fan 73 is secured. At the front end of the cabinet and centrally of its width, is suspended a vertical pipe 78, which passes through the top of the cabinet and extends to within a slight distance of the water level of the tank. A series of lateral branch pipes 79 are secured to the pipe 78 by cross couplings 80, and these pipes terminate about half way between the vertical pipe 78 and the side walls of the cabinet. Lateral pipes 81 also project from the upper portion of the pipe 78, and these pipes extend out beyond the pipes 79 and are coupled to vertical pipes 82, which are provided with inwardly extending lateral branch pipes 83, which alternate with the pipes 79. The pipes 79 and 83 are provided with spraying nozzles 84, which are adapted to be turned to cause water to discharge through them at any desired angle. The vertical pipe 78 is connected by a pipe 84ᴬ with the outlet of a rotary pump 85, the inlet of which is connected by a pipe 86 with a small water receptacle 87, on the side of the cabinet, which communicates with the tank and therefore has the same water level as the tank. The receptacle 87 is centrally divided by a vertical screen 88, and the pipe 86, enters the receptacle on that side of the screen farthest from the tank, so that foreign substances in the water of the tank will not be drawn through the pipe 86. The tank is filled by a supply pipe 89 which is connected with the local water supply and which is provided with a cut off valve 90. When the tank is once filled, the water therein may be used for a long time before it is again necessary to replenish the tank from the local water supply. The pipe 84^A is provided with a valve 91 by which the pressure of water flowing through the nozzles 84 may be regulated, and a branch pipe 92 having a valve 93 is connected with the pipe 84^A below the valve 91, and when the valve 91 is closed and the valve 93, opened, the pump 85 acts to empty the tank through the pipe 92. Across the back end of the tank is supported a double row of vertical baffle plates 94 and 95, which are inclined at an angle of forty-five degrees, the plates 94, however, being at right angles to the plates 95, and alternating with them. The rear edges of the plates 94 are given a semicircular roll toward the right while the rear edges of the plates 95 are similarly rolled toward the left. These rolled edges of the baffle plates catch any water which may strike the plates and thus prevent such water from being drawn through the fan 73. When water is being forced through the nozzles 84 as shown in Figure 3, and the fan 73 is in operation, atmospheric air is drawn through the cabinet, by the said fan, and through the jets of water, and is thereby cooled, and this cooled air is forced through the pipe 72 to the entrance end of the tunnel and on through the said tunnel. As the coated cakes are carried slowly through the said tunnel by the belt 3, they are subjected to this blast of cool air, and by the time they reach the outlet end of the tunnel, the chocolate coating on the cakes is cooled and hardened sufficiently to permit of the removal of the cakes by attendants.

In order to prevent a back flow of air through the tunnel, its entrance end is closed by a plate 96 and a horizontal plate 97 extends from the plate 96 to a point a short distance beyond where the pipe 72 enters the tunnel, the plate 97 being supported on cross strips 98. The plate 97 is far enough above the belt 3 to permit the passage of cakes of any thickness. Any back flow of air in the tunnel is pocketed by the end 96 of the tunnel and by the plate 97 and its direction is thereby reversed.

As the chocolate coating cools and hardens it naturally adheres to the canvas belt or to the sheets of paper 14, when such sheets are employed, so that means must be employed for automatically disconnecting the cakes from the belt or paper, as the case may be as they emerge from the tunnel, and this operation is accomplished in the following manner:

Hangers 99 are secured to the side bars 10 adjacent the outlet end of the tunnel, and in these hangers is supported a roller 100. A gap 101 is formed in the belt supporting table 9 at the outlet end of the tunnel, and the end of the table next the tunnel is beveled to a thin edge 102 as shown in Fig. 1. The opposing edge of the table is also beveled, and a roller 103 is mounted in the side rails so as to lie close to the beveled edge 102. The belt 3 is passed over the beveled edge 102 and back over and around the roller 100, then forward again over the roller 103 and on to the table 9 again. It will be seen by reference to Fig. 1, that as each transverse row of cakes reaches the edge 102 of the table, the cakes are tipped slightly, but their advance edges are instantly caught by the portion of the belt which bridges the gap between the opposing edges of the table, and which passes over the roller 103 and as this lap of the belt has a forward movement the cakes are carried over the gap and on to the distributing part C of the apparatus; and in passing over the gap, the cakes are entirely disconnected from the belt, so that they may be quickly removed by the attendants.

In Fig. 6 I have shown still another method of disconnecting the coated cakes from the belt. In this arrangement I extend an anglebar 104 across the outlet end of the tunnel and support the same upon uprights 105 which are secured to the upper ends of the adjacent legs of the frame of the apparatus. The anglebar is positioned with its apex edge, uppermost, and the said bar is about seven or eight inches above the level of the table 9. The belt 3 passes over the angle bar and therefore slopes from the table up to the angle bar, as it passes out of the tunnel, and from the angle bar, down to the distributing end of the table, as clearly shown. In passing over the anglebar, the belt assumes a sharp angular bend which breaks each row of the cakes loose from the canvas as they pass over the said anglebar, so that they may be quickly removed by attendants at this end of the apparatus. Upon each side rail 10 of the distributing end C of this apparatus are secured horizontal brackets 106, upon which horizontal boards 107 are supported, which form tables upon which the cakes may be deposited as they are removed from the table. These boards or tables 107, however, are chiefly intended to support the boxes or containers in which the cakes are packed by the attendants.

Strips 7^A are secured upon the outer edges of the tables 107 and these strips extend a slight distance above the level of the said tables and thus prevent the boxes from being shoved over the tables and on to the floor.

Figures 16, 17:
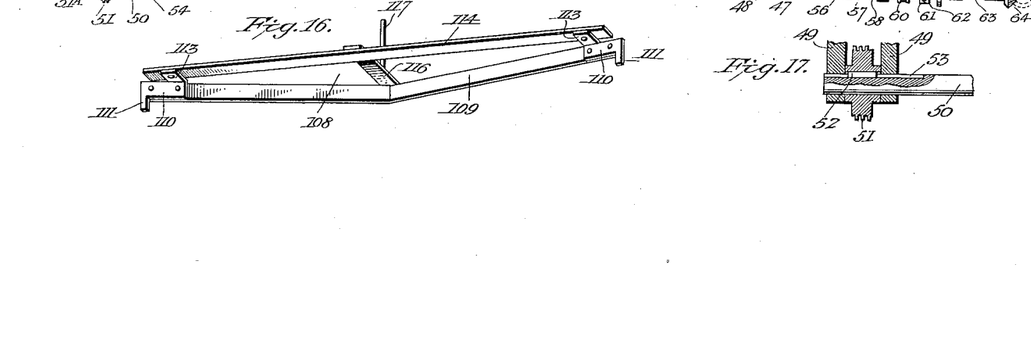
Figure 16 is a perspective view of the scraper for removing coating from the upper lap of the conveyor belt.
Figure 17 is a detail sectional view showing the feather key connection between the belt driving shaft and the worm pinion carried thereby.

In order to prevent an accumulation of chocolate or other coating upon the belt, I provide a series of scrapers which are arranged as follows: Near the roller 22 at the end of the distributing portion C is positioned a scraper 108, a perspective view of which is shown in Figure 16. This scraper comprises a scraper bar 109 which extends the full width of the frame of the apparatus and is given a sharp bend centrally of its length which causes the two parts of the bar to stand at a slight angle to each other. A plate 110 is bolted upon each end of the scraper bar and each of these plates has at its outer end, a depending projection 111 which is adapted to rest in a recess 112 in the edge of the adjacent side bar 10, as clearly shown in Fig. 4. The scraper rests upon the belt with its apex pointing rearward, and the projections 111 prevent it from being moved out of position by the belt. Each plate 110 is also provided with a horizontal member 113, to which is secured the end portion of a flat horizontal bar 114 the ends of which lie in recesses formed in blocks 115 which are secured to the side bars 10 and which prevent tilting movement of the scraper. A central strip 116 connects the scraper 109 and the bar 114 and this strip is provided with an upright post or stem 117 upon which may be placed one or more centrally apertured weights 118 by which the scraper is forcibly pressed against the belt. At each end of the scraper, a box 119 is secured to the adjacent side bar 10, and the material removed from the belt is guided by the inclined faces of the scraper into the respective boxes. A second scraper 120 is secured to the legs of the apparatus so as to engage the under lap of the belt adjacent the roller 22, as shown in Figures 1 and 15. The scraper is provided with bolt slots 121 through which the bolts are passed which secure the scraper to the legs, and these slots permit adjustment of the scraper with respect to the belt.

Still another scraper 122 is employed for removing any material that may adhere to the face of pinch roller 29, as an accumulation of material on the pinch roller would jam the belt between the said roller and the drive roller 30. The scraper 122 is adjustably secured to a cross bar 123 which is inclined to the vertical at an angle of forty-five degrees and its end portions rest in the guideways 27 in which are supported the bearing blocks 28 for the shaft of the pinch roller. The right angled ends of arms 124 are secured to the cross bar 123, near its ends and the free ends of these arms are apertured to receive the end portions of the shaft of the pinch roller, as will be understood by reference to Figure 5. The adjustment of the scraper 122 is accomplished by forming bolt slots 125 in the cross bar 123 and by passing cap bolts 126 through these slots and into threaded holes in the scraper 122; the slots 125 permitting the scraper to be moved toward or away from the face of the pinch rollers.

Guards 127 are secured beneath the drive roller 30, to prevent the paper sheets 14, when used, from hanging down as they pass under the said roller, and similar guards 128 extend under the roller 22, for the same purpose. If desired, an electric fan 129 may be supported on a shelf 130 at the entrance end of the tunnel, the air from which is directed against the cakes as they near the entrance of the tunnel, and thus assists in cooling them.

In operation the cakes are passed continuously through the coating machine upon the wire belt 5, and their entire surfaces are covered with chocolate in a warm, liquid state. They are then transferred to the belt 3, which conveys them a distance of about ten feet before they enter the tunnel. After entering the tunnel they are subjected to a continuous blast of chilled air, which is drawn through the water jets of the cabinet 75, by the fan 73 and thence forced through the pipe 72 to the said tunnel. The tunnel is about forty feet long, and as the belt carrying the cakes moves slowly, the coating on the cakes is chilled and hardened by the time they reach the outlet end of the said tunnel. At the outlet end of the tunnel, the cakes are disconnected from the belt by either the mechanism shown in Figures 1 and 2, or by the mechanism shown in Figure 6, according as one or the other mechanism is employed, and when the cakes pass to the distributing end C they may be quickly removed from the belt by attendants and packed in boxes for shipment.

Having described my invention, what I claim as new and desire to secure by Letters Patent, is:

1. A hot chocolate chilling apparatus, comprising a chocolate conveying system, a tunnel member through which said chocolate is conveyed, and means for delivering cooled air to said tunnel, means for delivering hot chocolate onto said chocolate conveying system, and means for loosening the chilled chocolate at the discharge end of said tunnel member.

2. A hot chocolate chilling apparatus consisting of a hot chocolate covered cake conveying system, an enclosed conveyor way through which said chocolate covered cakes are conveyed, means including an air cooling and chilling apparatus for maintaining a chocolate cooling and chilling atmosphere in said enclosed conveyor way, and connected to the entrance end portion of said enclosed way and arranged to deliver cool air into said enclosed way, said conveyor comprising an endless belt which passes through said enclosed way and beyond each end of the same, to provide a receiving portion for hot chocolate covered cakes from a source of supply, and a distributing portion from which the cooled chocolate coated cakes are removed.

3. A hot chocolate chilling apparatus consisting of a hot chocolate covered cake conveying system, an enclosed conveyor way through which said chocolate covered cakes are conveyed, means including an air cooling and chilling apparatus for maintaining a chocolate cooling and chilling atmosphere in said enclosed conveyor way, and connected to the entrance end portion of said way and arranged to deliver cool air into said enclosed way, said conveyor comprising an endless belt, which passes through said enclosed way and beyond each end of the same to provide a receiving terminal for hot chocolate covered cakes from a source of supply, and a portion from which the cakes are removed, and means for loosening the chilled chocolate covered cakes at the discharge end of the enclosed way.

4. A hot chocolate chilling apparatus, comprising a chocolate-coated-cake conveying system, a tunnel member through which said coated cakes are conveyed, and means for delivering cooled air to said tunnel, means for delivering hot chocolate coated cakes onto said chocolate conveying system, and means for loosening the chilled chocolate covered cakes at the discharge end of said tunnel member, said conveying system comprising an endless conveyor having a coated-cake receiving terminal and a discharging terminal, means for moving said conveyor at a uniform rate of speed, means for continuously depositing liquid-chocolate-coated cakes upon the said receiving terminal, and means for loosening the coated cakes, as they emerge from the tunnel.

5. A chilling apparatus for hot chocolate coated cakes, comprising a conveying system, a tunnel member through which said chocolate coated cakes are conveyed, and means for delivering chilled air to said tunnel; a humidifier comprising a cabinet having an open front end, arranged to hold a supply of water in its bottom, means for replenishing said supply of water, a plurality of independently adjustable water discharging nozzles arranged to discharge jets of water in said cabinet at its open end over said supply of water; a series of adjustable overlapping baffle plates arranged at the opposite end portions of said cabinet from its open end; a suction fan at the rear end of said cabinet, arranged to suck air between said water jets and over said supply of water and between said baffles plates, and an air conveying pipe extending from said fan into the entrance end portion of said tunnel.

6. An apparatus of the character described, comprising a coated-cake receiving portion, a cake delivering portion, a tunnel connecting said portions and an endless conveyor belt extending over said portions and through said tunnel, means for conveying chilled air to said tunnel, means for operating said belt and means for disconnecting said cakes from said belt as they emerge from the tunnel.

7. An apparatus of the character described comprising supporting means, a tunnel covering part of said supporting means, an endless conveyor belt on said supporting means and means for operating said belt; means for delivering liquid-material-coated cakes onto the receiving terminal of said belt, means for conveying a continuous blast of chilled air to said tunnel, means for disconnecting the coated cakes from the conveyor as they emerge from the tunnel, and scrapers for removing coating from said conveyor.

8. An apparatus of the character described, comprising a table, an endless belt conveyor, the upper lap of which is supported on said table and means for operating said belt, a tunnel which covers part of said table, a pipe for conveying a continuous blast of air into the entrance end portion of said tunnel, means for continuously depositing transverse rows of cakes upon the receiving terminal of said conveyor, means for adjusting the receiving terminal of the conveyor with respect to the cake depositing means, and means for disconnecting the coated cakes from the conveyor as they emerge from the tunnel.

9. An apparatus of the character described, comprising a table having a distributing portion and a tunnel which covers the remaining portion thereof, the opposite end of the tunnel from the said distributing portion being its inlet end, a table extending beyond the inlet enr of the tunnel and hinged at its end next the tunnel, and an endless belt conveyor the upper lap of which is supported on said tables, and means for operating the same; an endless conveyor for continuously depositing rows of liquid material coated cakes upon the receiving terminal of the conveyor, means for adjusting the hinged tables with respect to the level of the depositing conveyor, means for adjusting the terminal end of the main conveyor with respect to its proximity to the adjacent terminal of the cake depositing conveyor, a pipe for delivering a continuous blast of chilled air to the tunnel adjacent its inlet end, and means for disconnecting the cakes from the main conveyor as they emerge from the tunnel.

10. An apparatus of the character described comprising a receiving table hinged at one end, a table extending beyond and in line with the hinged table, a tunnel covering the latter table from its end next the hinged table to within a relatively short distance from its opposite end, an endless belt conveyor the upper lap of which is supported upon said tables and means for operating said belt, a horizontally adjustable plate on the free end of said hinged table, around the edge of which said belt passes, a roller carried by said plate and below the same around which said belt passes to the edge of said plate, a wire conveyor for continuously depositing rows of liquid material coated cakes upon the receiving terminal of the main conveyor, means for adjusting the free end of said hinged table with respect to the level of the wire conveyor, a pipe for delivering a continuous blast of chilled air to the end of said tunnel next the hinged table, and means for disconnecting the coated cakes from the belt conveyor as they emerge from the opposite end of the tunnel.

11. In an apparatus of the character described, a belt supporting table, rollers at opposite ends of said table, an endless belt which passes over said table and around said rollers; means for operating said belt, comprising a roller supported intermediate of the terminals of said belt and means for imparting rotation to said roller, a second roller adjustably mounted with respect to the first roller, the under lap of said belt being passed over the second roller and between it and the first roller and pinched between said rollers whereby the first roller is caused to draw the said belt between it and the second roller, in combination with means for continuously supplying rows of liquid material coated cakes to the receiving end of said belt, a tunnel which covers part of the upper lap of said belt, means for continuously supplying chilled air to the inlet end of said tunnel, and means for automatically breaking said cakes loose from said conveyor as they emerge from said tunnel.

12. In an apparatus of the character described, a belt supporting table, adjustable rollers at opposite ends of said table, an endless belt which passes over said table and around said rollers, means for operating said belt comprising a drive roller supported intermediate of the terminals of said belt, a worm gear on the shaft of said roller, a power driven worm pinion in mesh with said worm gear, a roller adjacent said drive roller and mounted in slidable boxes, the under lap of said belt being passed over the latter roller and between it and the drive roller, and hand screws for moving said adjustable boxes, whereby said belt is pinched between the adjustable roller and the drive roller, the latter roller acting to draw the belt between it and the other roller; in combination with means for continuously supplying rows of liquid material coated cakes to the receiving end of said belt, a tunnel which covers part of the upper lap of said belt, means for continuously supplying chilled air to the inlet end of said tunnel, and means for automatically breaking said cakes loose from said conveyor as they emerge from the tunnel.

13. In an apparatus of the character described, the combination with a table, a power-driven endless belt conveyor the upper lap of which rests upon said table, a tunnel which covers a part of the upper lap of said belt, means for continuously supplying chilled air to the entrance end of said tunnel, and means for continuously supplying liquid material coated cakes to the receiving terminal of said conveyor; of means at the outlet end of the tunnel over which the belt passes whereby the cakes are loosened from the belt.

14. In an apparatus of the character described, the combination with a table, an endless belt conveyor the upper lap of which rests upon said table, a tunnel which covers a part of the upper lap of said belt, a gap being formed in said table at the outlet end of the tunnel, means for continuously supplying chilled air to the entrance end of said tunnel, and means for continuously supplying liquid material coated cakes to the receiving terminal of said conveyor; of means for loosening said cakes from the belt as they emerge from the tunnel comprising a roller supported beneath said table and back of said gap, the upper lap of said belt being passed around the rear edge of said gap and over and around said roller and forward over the front edge of said gap, whereby a gap is formed in the surface of the belt by which the cakes are loosened from the belt as they are carried across the said gap and means for operating said belt.

15. In an apparatus of the character described, the combination with a table, a power-driven endless belt conveyor the upper lap of which rests upon said table, a tunnel which encloses a part of the upper lap of said belt; a gap being formed in said table at the outlet end of the tunnel, means for continuously supplying chilled air to the entrance end of said tunnel and means for continuously supplying liquid material coated cakes to the receiving terminal of said conveyor; of means for loosening said cakes from said conveyor as they emerge from the tunnel; of a roller supported beneath said table and back of said gap, a second roller supported beneath and close to the rear edge of said gap, the upper lap of said belt being passed around the rear edge of said gap and its direction reversed so as to pass over and around the first roller and then forward over the second roller and over the front edge of said gap whereby a narrow gap is formed in the surface of the belt by which the cakes are disconnected from said belt as they are carried across said gap; and means for supporting the under lap of said belt.

16. In an apparatus of the character described, the combination with a table, a power-driven endless belt the upper lap of which rests upon said table, a tunnel which encloses a part of the upper lap of said belt, means for continuously supplying chilled air to the entrance end of said tunnel, means for continuously supplying liquid material coated cakes to the receiving terminal of said belt, and means for disconnecting said coated cakes from the belt as they emerge from the tunnel, of a scraper supported on said apparatus beyond the outlet end of said tunnel and adapted to engage the upper face of the belt, a scraper adjustably supported on said apparatus and adapted to engage the under lap of the belt, and horizontal ways for supporting the under lap of the said belt.

17. In an apparatus of the character described, a table, a tunnel which encloses a part of the length of said table, a power-driven endless belt the upper lap of which rests upon said table and means for continuously supplying liquid material coated cakes to the receiving terminal of said endless belt; of an open-ended cabinet, means for sprayinging numerous jets of cold water within said cabinet, a suction fan on one end of the cabinet, and a pipe extended from the discharge end of said fan to the inlet end of said tunnel whereby chilled air is continuously forced through said tunnel in the direction of movement of said belt.

18. In an apparatus of the character described, a table, a tunnel which encloses a part of the length of said table, a power-driven endless belt the upper lap of which rests upon said table, and means for continuously supplying liquid material coated cakes to the receiving terminal of said belt; of an open ended cabinet the bottom portion of which comprises a water tank, a valved pipe for supplying water to said tank, a system of pipes supported at the front end of said cabinet having adjustable spraying nozzles, a pump for drawing water from said tank and forcing it through said pipes and out through said nozzles, a suction fan on the opposite end of said cabinet, and a pipe connecting the outlet end of said fan with the inlet end of said tunnel, whereby chilled and moistened air is drawn through said cabinet and forced through said tunnel in the direction of travel of said belt, and means for disconnecting said cakes from said belt as they emerge from said tunnel.

19. In an apparatus of the character described, the combination with a table, a power-driven endless belt the upper lap of which rests on said table, and means for continuously supplying liquid material coated cakes to the receiving terminal of said belt; of a tunnel which encloses a part of the length of said table, means for continuously forcing chilled air through said tunnel in the direction of the movement of said belt, and means for preventing back flow of air through said tunnel, comprising a plate which closes the rear end of said tunnel, and a horizontal plate which extends forward from said end plate a suitable distance, a space being left between said horizontal plate and said belt.

20. In an apparatus of the character described, a table, a tunnel which encloses the greater part of said table from its rear end, a supporting frame adjacent the rear end of said table, a table in line with the first table and hinged at one end to the said supporting frame, a horizontally adjustable plate on the free end of said hinged table, a roller supported by and beneath said adjustable plate, a roller at the opposite end of the first table, rollers mounted on said supporting frame, and adjustable with respect to each other, one of said adjustable rollers being a power-driven roller, an endless belt conveyor the upper lap of which rests upon said tables and extends around the roller at the end of the first table, and over the edge of the said adjustable plate, and around the roller carried thereby, the under lap of said belt being passed over one of the said adjustable rollers and between it and the adjacent adjustable roller and pinched between said rollers whereby movement is imparted to said belt, means for forcing chilled air through said tunnel in the direction of movement of the belt, means for continuously supplying liquid material coated cakes to the receiving end of said belt, means for adjusting the free end of the hinged table with respect to a horizontal plane, and means for disconnecting the cakes from the belt as they emerge from the tunnel.

21. In an apparatus of the character described, the combination with a liquid chocolate coating machine and an endless wire belt for continuously conveying cakes through said machine; of a table, a plate on the end of said table horizontally adjustable with respect to the terminal of said wire belt, a roller supported by said adjustable plate and close to the under side and forward edge of the same, an endless power-driven belt which passes under said roller and over the edge of said adjustable plate, said belt receiving the coated cakes from said endless wire conveyor, brackets on said coating machine and hand screws which pass through the ends of said adjustable plate and rest upon said brackets, whereby the end of said table may be adjusted with respect to the level of said wire conveyor.

22. In an apparatus of the character described, the combination with an endless belt-supporting table; of a horizontal plate rigidly secured upon the end portion of said table, L-shaped bars adjustably secured to said plate and extending beyond the front edge of the same, L-shaped bars rigidly secured to said plate in line with the adjustable bars, their vertical members being next each other, thumb screws threaded in the vertical member of the rigid bars and bearing against the vertical member of the adjustable bars, a plate secured to the extended portions of said adjustable bars, hangers on the under side of the latter plate and a roller mounted on said hangers whereby an endless belt on said table is passed around said roller and is given a short angular turn over the edge of said plate, said plate being adjusted to extend the length of the table.

23. In an apparatus of the character described, the combination with a table, an endless belt the upper lap of which is supported upon said table, a supporting frame having horizontal guideways, bearings adjustably mounted in said guideways, rollers having shafts which are journalled in said bearings, one of said rollers being a pinch roller and the other a power-driven roller, the under lap of the belt being passed over the pinch roller and between it and the other roller and pinched between said rollers whereby motion is imparted to said belt; of a scraper for said pinch roller, comprising a transverse inclined bar the ends of which rest in the adjacent guideways, arms secured to said bar and pivotally attached at their free ends to the shaft of said pinch roller, and a scraper adjustably secured to said cross bar and adapted to bear against the surface of said pinch roller.

24. In an apparatus of the character described, the combination with a supporting table and an endless belt conveyor the upper lap of which rests upon said table; of a scraper for said belt comprising a bar bent midway of its length to form two parts at an angle to each other, a transverse bar connecting the ends of the scraper and having depending projections which enter recesses in the side of said table, a plate connecting the scraper and the transverse bar and having an upright weight receiving post, and receptacles on the sides of said table in line with the ends of said scraper.

25. In an apparatus of the character described, the combination with a table, and an endless belt conveyor, the upper lap of which rests upon said table; of suitable paper sheets, the forward edges of which are secured to said conveyor, the free end of each sheet overlapping the secured end of the sheet following, and means for supporting the sheets in horizontal positions on the under lap of the conveyor.

26. In an apparatus of the character described, the combination with a table, and an endless belt conveyor, the upper lap of which rests upon said table; of suitable paper sheets, the forward edges of which are pasted to said conveyor, the free end of each sheet overlapping the pasted end of the sheet following, cross bars secured beneath said table, and longitudinal slats which are supported on said cross bars, said slats being adapted to support the sheets on the under lap of the belt in horizontal positions.

In testimony whereof I affix my signature in presence of two witnesses.

PETER RASMUSSEN.

Witnesses:
G. SARGENT ELLIOTT,
ELIZABETH SMITH.